United States Patent
Johnson

Patent Number: 5,915,949
Date of Patent: Jun. 29, 1999

[54] METHOD AND APPARATUS FOR LASER PEST CONTROL

[76] Inventor: W. Dudley Johnson, 3300 S. 16th St., Milwaukee, Wis. 53215

[21] Appl. No.: 08/300,089

[22] Filed: Sep. 2, 1994

Related U.S. Application Data

[63] Continuation-in-part of application No. 07/898,012, Jun. 12, 1992, Pat. No. 5,343,652.

[51] Int. Cl.$^6$ ........................................... A01M 1/00
[52] U.S. Cl. .................................................. 43/124
[58] Field of Search ................... 43/124, 134, 132.1, 43/138, 58, 133

[56] References Cited

FOREIGN PATENT DOCUMENTS 3825389  2/1990  Germany .
1202233  2/1988  Japan .

*Primary Examiner*—Kurt Rowan
*Attorney, Agent, or Firm*—Philip G. Meyers; Gardere & Wynne, L.L.P.

[57] ABSTRACT

The invention provides a method for controlling pests which, according to one aspect of the invention, uses a laser beam to exterminate pests hidden behind or within a solid barrier. The laser light must have a wavelength and power to sufficient exterminate the pests hidden behind or within the barrier without damaging the barrier. Such a method can be used to control ant and termite infestation of common household building materials and agricultural pest control of crop fields.

15 Claims, 2 Drawing Sheets

METHOD AND APPARATUS FOR LASER PEST CONTROL

This application is a continuation in part of U.S. Ser. No. 07/898,012 now U.S. Pat. No. 5,343,652, filed Jun. 12, 1992.

TECHNICAL FIELD

This invention relates to pest control, more particularly to use of a concentrated energy source such as a laser beam to exterminate pests.

BACKGROUND OF THE INVENTION

Control of pests such as insects has evolved from hand slaps to fly swatters to chemical insecticides, electric bug traps, glue covered strips, and other devices. Often an attractant, such as an ultraviolet light, scent or edible bait, is used to lure insects or rodents into the trap. See, for example, Phillips, U.S. Pat. No. 4,127,961, issued Dec. 5, 1978. In one common trap, an ultraviolet light attracts insects onto an electrified grid which then electrocutes the insects. This device, however, sparks loudly, spatters debris, and is dangerous to humans. Mechanical traps also have drawbacks, for example, the need to lure the pest into a small space. Chemical pesticides can poison non-target species and pollute the environment.

Energy devices such as lasers have been proposed for use against insect pests. Lasers exist in several classes ranging from small, harmless beams to extremely intense beams usable as long range weapons. Japanese Patent No. 1-202, 233 suggests use of a handheld laser to kill ticks, fleas and other household insects. German Patent Publication No. 3,825,389 proposes use of a laser or sound beam against flying swarms of locusts. The latter method recognizes that destroying the insects completely would require too much energy, and therefore targets a specific organ structure such as wings or sensory organs to render the insects unable to fly. Even so, the energies described are too large for practical use using the method suggested.

Like insect control, rodent and mouse control has a long history ranging from the common mousetrap to devices that use striking bars to incapacitate the rodent when it passes by; see McKee, U.S. Pat. No. 4,349,980, issued Sep. 21, 1982 and McKee, U.S. Pat. No. 4,483,094, issued Nov. 20, 1984. Poison bait pellets have also long been used to exterminate rodents. The poisoned pellets are typically scattered or placed on the ground and attract rodents looking for food.

Pest control problems are usually not confined to easily accessible areas. More often, the pest is located and remains behind a solid barrier, such as a wall, and cannot be exterminated without damage to the existing structure or at the very least without great difficulty. The present invention addresses a number of the problems associated with conventional pest control, and further provides a method for controlling pests behind solid barriers.

SUMMARY OF THE INVENTION

The invention provides a method for exterminating pests by directing a beam of electromagnetic radiation, particularly light, most preferably laser light, against the pest. The beam preferably has a power and wavelength sufficient to blind or otherwise incapacitate the pest without immediately killing it. Even power ratings of from about 0.1 watt up to (but less than) 10 watts are effective for this purpose.

One specific method of the invention involves repetitively scanning a location frequented by pests using an automatic laser scanning system. This can provide continuous pest control in an infested area without use of mechanical traps or chemicals and without need for a human operator. An apparatus suitable for use in such a method comprises a source of a laser beam capable of killing or harming the target pest, a scanner capable of directing the laser beam produced by the source within a scanned area to contact the pest, and an attractant disposable in order to lure the pests into the area scanned. This embodiment is most suited for use in remote areas so that accidental exposure of a human or non-target animal can be avoided.

A method for agricultural pest control of the invention which involves scanning a crop field with a laser beam having a power and wavelength sufficient to blind, harm or kill crop destroying pests present in the field without substantially harming the crop plants growing in the field. The laser can be conveniently mounted on a farm implement so that a laser having a limited scanning range can be systematically drawn over a large territory at close range. An apparatus suited for use in such a method comprises a vehicle, particularly a farm vehicle, having a laser beam projector mounted thereon. The laser can either scan an area near the vehicle as the vehicle moves along, or one or more broad divergent laser beams can be used.

A method according to the invention for exterminating pests hidden behind or within a solid barrier comprises transmitting a laser beam through the barrier against the pest hidden behind or within the barrier. The laser must have a power and wavelength sufficient to pass through the barrier and kill or harm the pest without damaging the barrier. Such a method can be used to control ant and termite infestation of common building materials such as wood.

Alternately, where the barrier is made of an inorganic material less permeable to laser light but more suited for repair, such as plaster or drywall, a small hole can be formed in the barrier so that a flexible laser transmitting device, such as a fiber optic cable, can be inserted directly into the space behind the barrier. Such a method for exterminating pests hidden behind or within a solid barrier made of an inorganic structural material includes the steps of making a hole in the barrier, inserting a laser delivery device in the hole so that laser light can be introduced directly into a space behind the barrier where pests are present, and bathing the space with laser light having a power and wavelength sufficient to exterminate a pest hidden behind or within the barrier without damaging adjacent structures. These and other aspects of the invention are set forth in detail in the description that follows.

BRIEF DESCRIPTION OF THE DRAWINGS

The invention will hereafter be described with reference to the accompanying drawings, wherein like numerals denote like elements, and.

DETAILED DESCRIPTION OF PREFERRED EMBODIMENTS

Figure 1:
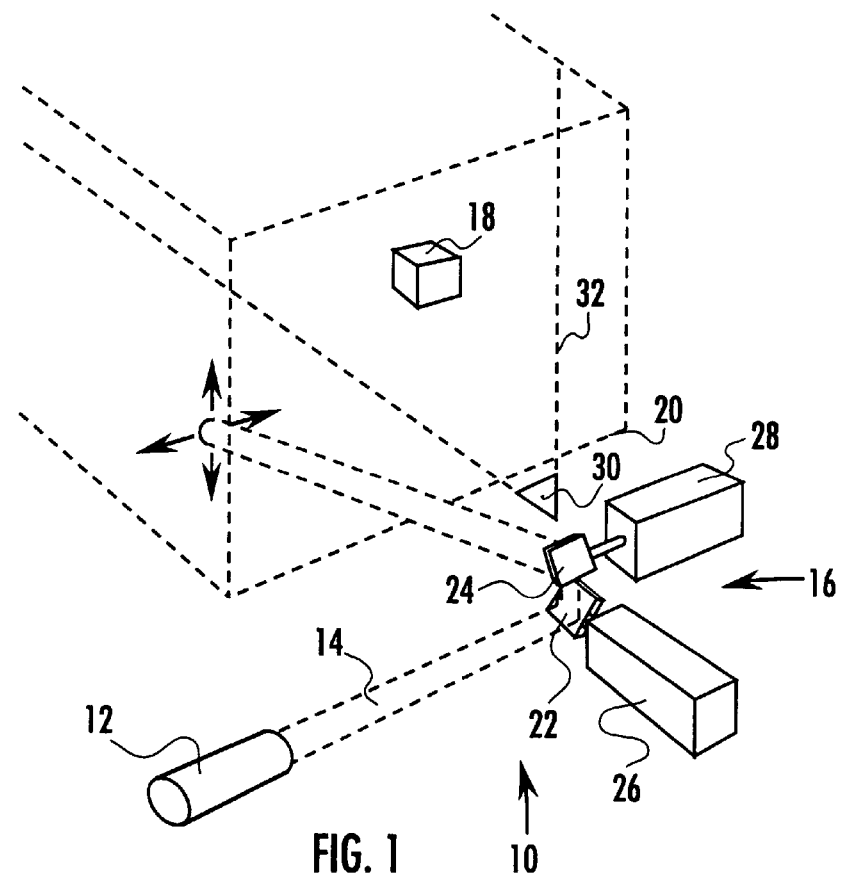
FIG. 1 is a schematic diagram of a laser scanning method and apparatus according to the invention.

Lasers have been used in many applications because of their ability to align light waves so that the light is collimated and coherent and the energy remains concentrated. These qualities allow lasers to be used in numerous applications ranging from the cutting of metal to the performing of delicate surgical operations. In accordance with the invention, the unique qualities of laser beams, optionally in conjunction with the rapid reorientation of the beam through the use of a controlled scanner, provide a system effective for destruction of sensory systems, particularly the visual organs, of pests.

The invention uses light, particularly laser light, to control a variety of pests while avoiding danger or damage to other creatures and the surroundings. In particular, certain relatively low power lasers are destructive to sensory organs, particularly the eyes, of insects and other pests. According to the invention, a laser beam is directed towards a particular spot or scanned throughout a predetermined area to incapacitate one or more types of pests, for example, grasshoppers. The laser beam strikes the insect's multi-faceted eyes, and the eyes are damaged or destroyed, blinding the insect. The blinded insect is effectively incapacitated and soon dies. A blind grasshopper, for example, may remain immobile until it dies.

Different eyes have various levels of moisture and include different types of tissue, requiring the selection of a laser which will not reflect or pass through the eye without destroying the effectiveness of the eye. Insects are particularly vulnerable to laser beams because their multi-faceted eyes are capable of picking up light from a variety of directions regardless of the orientation of the insect's body.

A $CO_2$ laser having a wavelength of 10.6 microns is absorbed by water, whereas a neodymium-YAG laser having a wavelength of 1.06 microns is transmitted through water. Insect eyes are typically very dry with a mosaic of compartments, whereas the eyes of a human being or higher animal contain a large quantity of water. Thus, a $CO_2$ laser can be adjusted to a power level sufficiently low to blind an insect without blinding a human being. Laser exposure limits for the human eye vary widely depending on the wavelength of the laser. For example, for an argon laser having a wavelength of 488 or 514.5 nm, the ocular exposure limit for humans is $0.5\mu J/cm^2$ for exposures of 1 nanosecond to 18 microseconds, whereas for a $CO_2$ laser at $10.6\mu m$ the comparable limit is $10\ mJ/cm^2$ for exposures of 1–100 nanoseconds. See generally the *Laser Safety Guide*, Laser Institute of America, Table 2 at page 10, the contents of which are incorporated herein by reference.

Since laser damage to an eye or organ of a pest will vary depending on many different parameters, including laser power level, focus, exposure time, wavelength, and the absorption/reflection characteristics of the target and the medium through which the beam must pass to reach the target, the conditions needed to practice the invention will vary widely depending on the specific application. Exposure time in turn depends on the scanning speed and beam diameter. A Q-switched laser, which could be used in the invention, delivers a huge energy over a very short period of time and might do more damage to an eye structure than a lower power laser acting over a longer period delivering the same total energy. Total energy delivered to the target does not by itself determine the extent of damage. However, persons skilled in the art can readily determine through routine experimentation a variety of different sets of conditions in which lasers can be used in accordance with the invention.

As discussed further below, pests that can be exterminated according to the method of the invention includes virtually all common pest types, including invertebrates such as insects and even mammals such as rodents. By choosing the type of light having appropriate parameters for the destruction of the eyes or other sensory organs (such as antennae) of a particular pest, the pest can be most efficiently incapacitated with reduced danger to nontarget species. The parameters include the wavelength of the light, the level of absorption of laser light by the eyes of the pest, and the duration of exposure to the light. The latter depends on the scanning rate and beam width, which determine how long the beam hits the eye or target organ, and also on whether or not the laser is pulsed or continuous. At relatively low power levels of 2 to 10 watts, an exposure duration of about 1 second or longer is needed to blind a typical insect or rodent pest. If a higher power level is used, the needed exposure time decreases.

In one aspect of the invention, a laser beam is directed throughout an area so that a particular pest within the area can be exterminated without harming the surrounding foliage or environment. An attractant can be used to encourage more pests into the vicinity of the stationary or sweeping laser beam. Use of an attractant allows the laser beam to be directed or scanned over a much smaller or more defined area as may be appropriate in certain applications.

Referring to FIG. 1, a pest control system or apparatus 10 in accordance with the invention comprises a laser source 12 which produces a laser beam 14, a scanner 16 that directs beam 14 according to a predetermined, repetitive pattern, and an attractant 18 disposed in a target area 20. Scanner 16 includes a pair of reflectors (mirrors) 22, 24 rotatable on axes set at right angles to each other. Associated drive units 26, 28 pivot each mirror 22, 24 in accordance with the programmed pattern. Beam 14 reflects off of mirrors 22, 24 in succession such that pivoting of mirrors 22, 24 causes beam 14 to move in both X and Y directions. The pattern may comprise a conventional raster scan.

In the event that rodents or other pests become wary of the trapped area, or visitation of the infested area by the pests becomes infrequent, a commercially available motion sensor 30 or similar detection device (e.g., a weight-sensitive floor pad) could be connected to system 10 so that the system 10 shuts down if no motion is detected in target area 20 and restarts once motion is detected. A suitable delay may be provided between detection of movement and activation of system 10 to allow rodents or other pests to enter the target area and approach attractant 18. In the alternative, sensor 30 can cover a smaller sub-space 32 within target area 20, the smaller space preferably being centered on the attractant 18. With or without sensor 30 or its equivalent, system 10 can function automatically (without need for a human operator) even in a remote or confined location inaccessible to humans.

Beam 14 may be continuous or pulsed. Laser source 12 may be any type of commercially available laser of sufficient power, such as a $CO_2$, Nd-YAG, Nd-glass, helium-neon, ruby, aluminum-gallium-arsenide, dye, helium-cadmium, argon, krypton, or KTP-YAG laser. Wavelengths for these known lasers vary from about 0.4 to 10.6 microns, but wavelengths outside this range, for example, all infrared, visible and ultraviolet light, could also be employed. Depending on the type of pest, the power level of laser source should be at least about 2 watts for animals such as rodents, and at least about 0.1 watt for insects and other small or microscopic creatures. For the former, a range of from 2 watts to as high as 1000 watts, more generally 2 to 100 watts, is preferred. Power levels above 100, especially 1000 watts are effective to destroy pests, but are dangerous and inefficient, and can damage surrounding objects. For purposes of the invention, power level in watts as discussed herein refers to the average power per $cm^2$ delivered to the target. Lasers of all wavelengths in the range of from 0.1 to 10 watts are preferred against insects and other small creatures because these relatively low power levels are effective for blinding insects with minimal energy consumption.

Scanner 16 may be a commercially available moving mirror imaging unit such as those of the LK series available from General Scanning, Inc, or a unit driven by an oscillator or function generator such as the Model 3020 Sweep/Function Generator made by Dynascan Corporation. Accessories that focus the beam to a spot may be used to maintain a desired beam diameter throughout the target area. A lens or equivalent device, such as a combination of curved mirrors, may be used to cause the beam to diverge (widen) with increasing distance.

Scanner 16 may move beam 14 back-and-forth in a single direction, e.g., with only one moving mirror, or may rapidly vector or direct beam 14 throughout a coordinate plane as shown. Scanner 16 is controlled by various methods known to those skilled in the art including function generators, oscillators, computers, etc. which are capable of providing accurate and rapid redirecting of laser beam 14.

Scanning speed will depend on other factors such as beam diameter and intensity and the specific target pest, and is generally selected so that if beam 14 passes over the eyes of an immobile target pest, the duration of exposure to the beam will be sufficient to blind the pest. The beam scanning speed is not critical and may vary widely depending on the other factors. A scanning speed of 300 Hertz (cycles per second) is typical, with speeds up to 1 KHz or more possible. Slower speeds of less than 1 Hz may be desirable in some circumstances.

Attractant 18 may take a variety of forms. In general, anything that is effective to lure the target pests into the scanned area can be used, such as an ultraviolet light source, which attracts a variety of insects. Other possible attractants include an incandescent or fluorescent light, sound generator, pest hormone, odor generator, an object with a specific color, and a bait such as food.

When pest control system 10 is turned on, laser beam 14 repetitively scans target area 20, either continuously or intermittently. Alternatively, a sufficiently powerful diverging beam could be used instead to cover the entire target area simultaneously from a fixed position, either constantly, intermittently or in response to movement detected by sensor 30 within the target area. In any of these embodiments, an insect, rodent or other pest entering the target area encounters the laser beam and is blinded. The pest is then unable to fend for itself and will eventually die. For purposes of the invention, "exterminating" a pest refers both to direct destruction of the pest using a laser beam and also to indirect destruction by injuring the pest to the point that it cannot survive.

The laser wavelength and energy level may need adjustment for each situation depending on the type of pests to be exterminated, the range of the pests from the laser source, and the environment surrounding the pests in order to most effectively exterminate a specific pest without damage to the environment. Further, as noted above, incapacitation according to the invention can also be carried out against other pest sensory organs, such as antennae, or even against wings in order to render a flying insect unable to fly.

The pest control system 10 may be adapted for use in enclosed environments. Such environments include warehouses, elevators, basements, sewers, greenhouses and other environments where pests reside.

Figure 2:
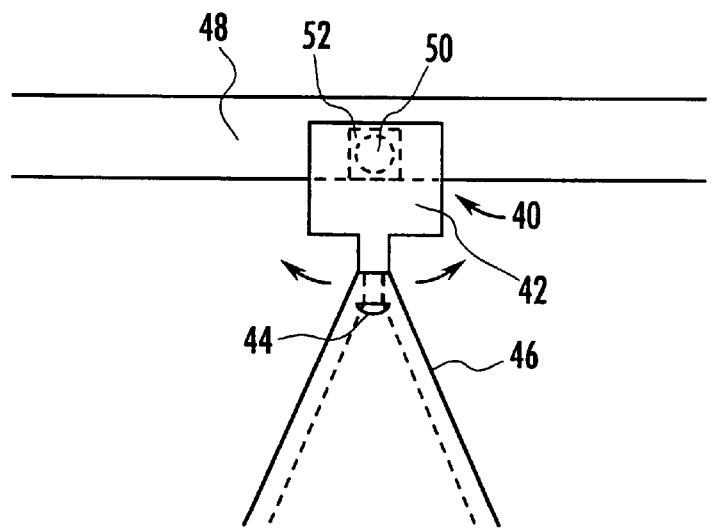
FIG. 2 is a schematic diagram of an exemplary divergent laser beam scanner according to the invention.

Referring now to FIG. 2, a laser projector 40 according to the invention is adapted for use in the method for agricultural pest control of the invention. Projector 40 includes a laser source 42, a beam widening lens 44 that causes the beam from laser source 42 to diverge to cover a larger area, and a cone-shaped shade 46 for minimizing leakage of laser light in directions other than the desired downward direction. Projector 40 may, for example, be mounted on a crossbar or similar member 48 of a farm vehicle (e.g., a tractor) or a trailer for such a vehicle.

Projector 40 bathes crops in laser light as the vehicle passes through the field, simultaneously cultivating or delivering a fertilizer to the field. An axle 50 and pivoting drive unit 52 may be provided so that projector 40 swings from side-to-side, covering a larger area as the vehicle moves forward. Use of a relatively low powered laser source 42 in this manner can permit destruction of crop-destroying pests present in the field without substantially harming the crop plants growing in the field. The laser power level sufficient to destroy insect or rodent eyes is much less than the level needed to injure some kinds of vegetation.

Figure 3:
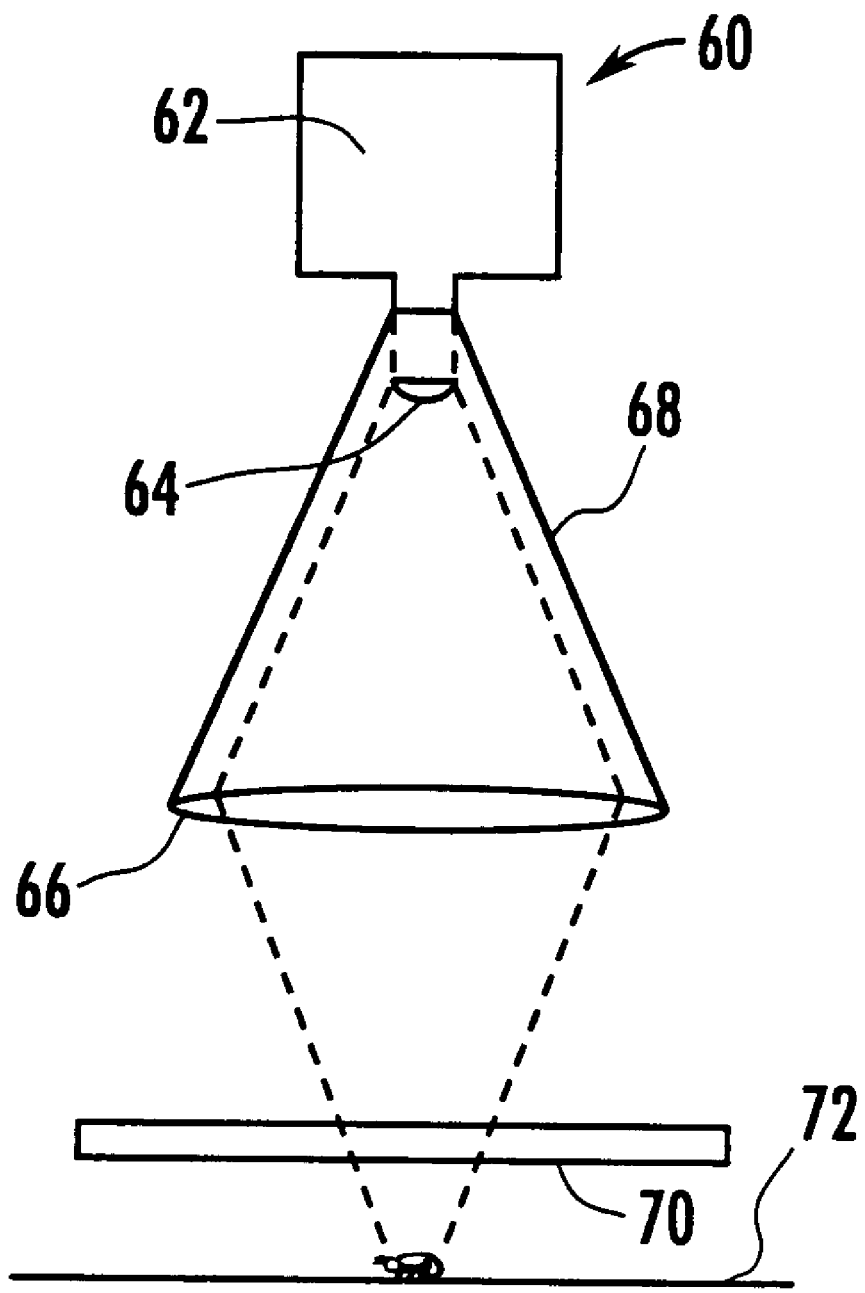
FIG. 3 is a schematic diagram of an exemplary convergent laser bean scanner for controlling pests hidden behind a solid barrier according to the invention.

FIG. 3 illustrates a laser projector 60 adapted for use in the method for controlling pests hidden behind or within a solid barrier 70. Projector 60 includes a laser source 62, a beam widening lens 64, a corresponding beam narrowing lens 66, and a cone-shaped shade 68 for rigidly connecting lens 66 to projector 60 at a constant distance from lens 64. Lens 64 is used (if needed) to defocus the laser light in front of solid barrier 70 to prevent damage thereto, and lens 66 is used to focus the laser light behind barrier 70. Beam widening and narrowing lenses 64, 66 are preferably constructed of AR, AR coated glass lenses, i.e., lenses coated on both sides with antireflective material. At certain laser wavelengths, such as used in an experiment discussed later, the laser power level required to exterminate insects is sufficiently less than the level needed to damage wall materials such as wood.

Where the barrier is of a type that will not readily permit a relatively low power laser to pass through, such as a wall of an inorganic material such as brick, stone, plaster, drywall or the like, a flexible delivery device such as a fiber optic cable can be inserted directly into a hole drilled in the barrier so that laser light is introduced directly into the space beyond without having to penetrate the barrier. The hole may be made using a mechanical drill, or the laser itself can be used to make a precise hole. The process may be repeated at several sites to make sure that all pests in the area are exterminated.

In each instance, the operator can first insert the cable, then withdraw from the area before activating the laser source in order to ensure safety. When the laser has been used at each site, the holes may then be repaired using joint compound, spackle or the like. The fiber optic cable may, if desired, be left in place inside the wall or other barrier for re-use at a later time. A second fiber optic cable connected to a video camera may be inserted through the hole to inspect the site for infestation before or after the laser treatment. This method permits use of a lower power laser because there is no need for the light to pass through the wall, but does require breaching the barrier at one or more sites.

An experiment of the method for controlling pests hidden behind solid barriers was performed with promising results. A Nd-YAG laser was used to deliver a beam through a fiber optic and directed at a piece of pine and a piece of oak wood, wherein each piece was tapered to a wedge shape. The wood pieces were about 4 inches long by 2 inches wide, and the thickness varied linearly from a point at one end thereof to about ¾ inch thick at the opposite end. By starting with the fiber optic positioned directly above the thick end of the wedge, and slowly moving the fiber optic toward the pointed end, it was possible to determine the maximum transmission depth at various power levels. Transmission through the oak piece of wood occurred at ½ inch at 10 watts and ⅝ inch at 40 watts. In the pine piece, transmission occurred at 5 watts at ¼ inch, 10 watts at ⅜ inch and 40 watts at ⅝ inch. A laser power meter was used to test for transmission of the beam. Transmission efficiency ranged from 0.8% to 3.0%, depending upon the grain of the wood and angle of the beam. However, it should be noted that transmission through wood is affected by the physical characteristics of the wood, particularly the pitch content. Transmission efficiencies could therefore vary substantially at different sites.

In a related experiment, red ant kill was achieved by transmitting 40 watts of power through a ¼ inch thick piece of pine wood. Other suitable lasers, such as KTP, argon and Q-switched YAG, may also be effective for transmission through wood, but not a $CO_2$ laser. Due to the high water content in wood, the $CO_2$ beam is absorbed by wood rather than transmitted because the wavelength of a $CO_2$ beam is readily absorbed by water.

The foregoing are only a few of the many possible environments in which these pest control methods and systems of the invention might be used. It will be understood that the foregoing description is of preferred exemplary embodiments of the invention, and that the invention is not limited to the specific forms shown. For example, in some instances forms of light or electromagnetic radiation other than lasers may provide equivalent effects. These and other modifications may be made in the design and arrangement of the elements without departing from the scope of the invention as expressed in the appended claims.

I claim:

1. A method for exterminating pests hidden behind or within a laser-permeable solid barrier, which comprises scanning the barrier with a laser beam, thereby bathing the barrier with laser light having a power and wavelength sufficient to pass through the barrier without substantially damaging the barrier and sufficient to exterminate a pest hidden behind or within the barrier.

2. The method of claim 1, wherein the solid barrier is comprised of wood.

3. The method of claim 1, wherein the pest is an insect.

4. The method of claim 3, wherein the insect is an ant.

5. The method of claim 3, wherein the insect is a termite.

6. The method of claim 1, further comprising focusing the laser beam at a point beyond the barrier.

7. The method of claim 1, further comprising defocusing the laser beam prior to passing through the barrier and refocusing the laser beam at a point beyond the barrier.

8. The method of claim 1, wherein the laser light has a power in the range of about 1 to 100 watts.

9. A method for exterminating pests hidden behind or within a solid barrier made of an inorganic structural material, which comprises making a hole in the barrier, inserting a laser delivery device in the hole so that laser light can be introduced directly into a space behind the barrier where pests are present, and bathing the space with laser light having a power and wavelength sufficient to exterminate a pest hidden behind or within the barrier without damaging adjacent structures.

10. The method of claim 9, wherein the solid barrier is a wall.

11. The method of claim 10, wherein the inorganic structural material is selected from brick, stone, plaster and drywall.

12. The method of claim 9, wherein the delivery device is a fiber optic cable.

13. The method of claim 9, further comprising inserting a probe through the hole and inspecting for infestation using the probe.

14. The method of claim 13, wherein the probe comprises a fiber optic cable connected to a video camera.

15. The method of claim 13, further comprising inspecting for infestation after bathing the space with laser light.

* * * * *